Jan. 13, 1925. 1,523,211
B. H. HOWARD ET AL
FEEDER FOR INGOT MOLDS
Filed Dec. 1, 1924 2 Sheets-Sheet 1
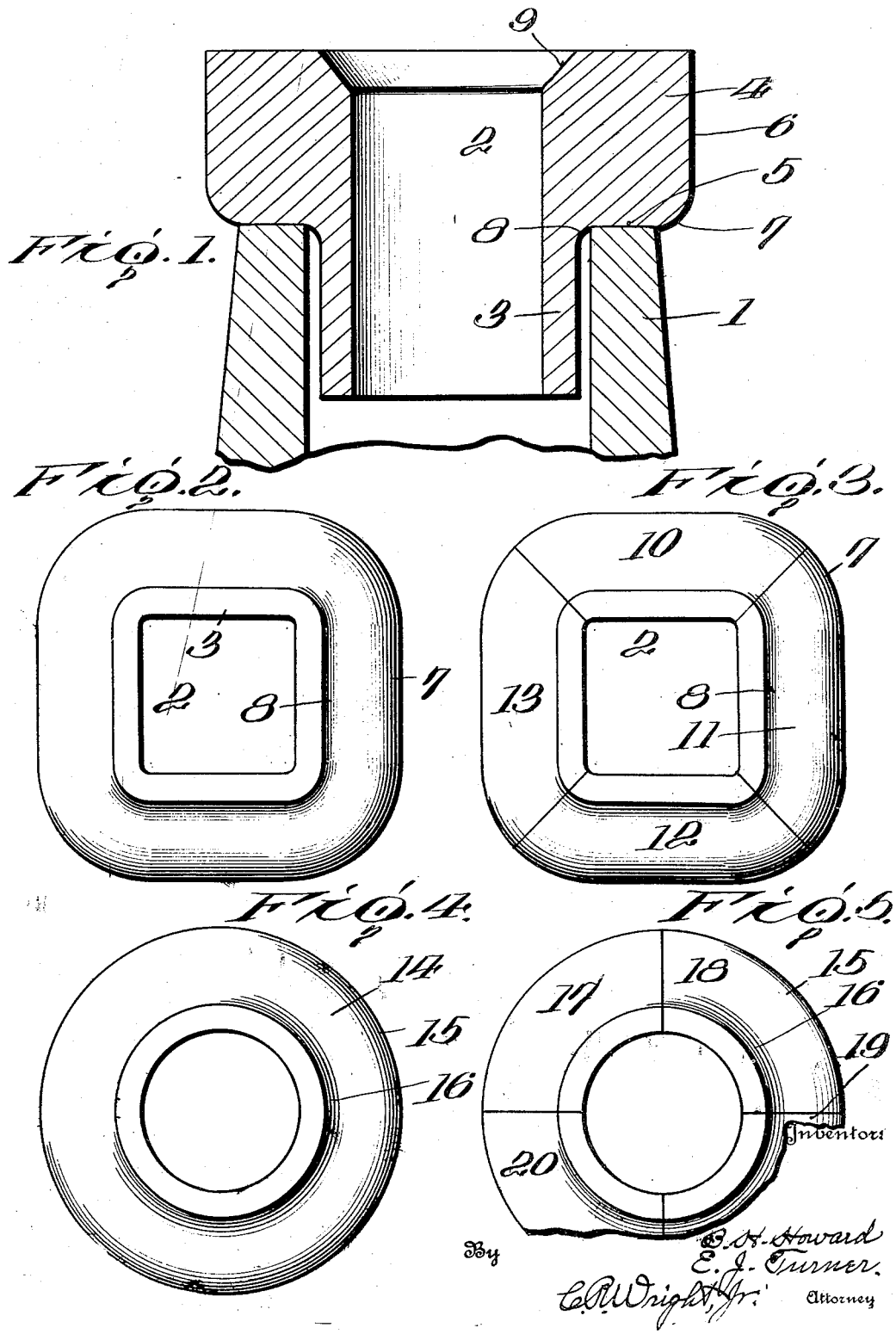

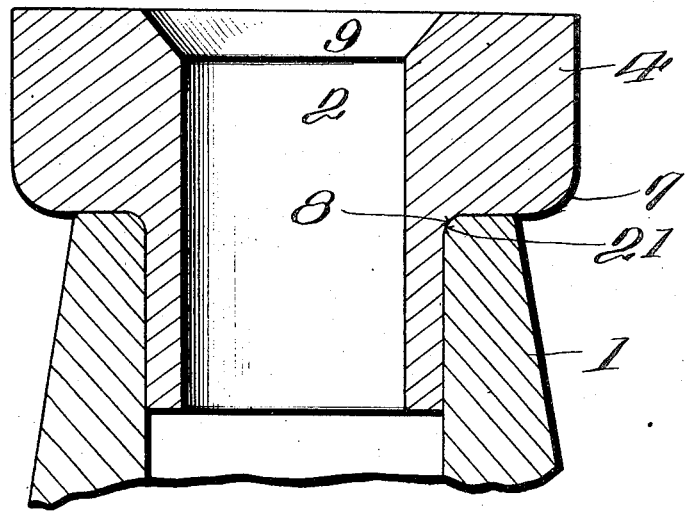
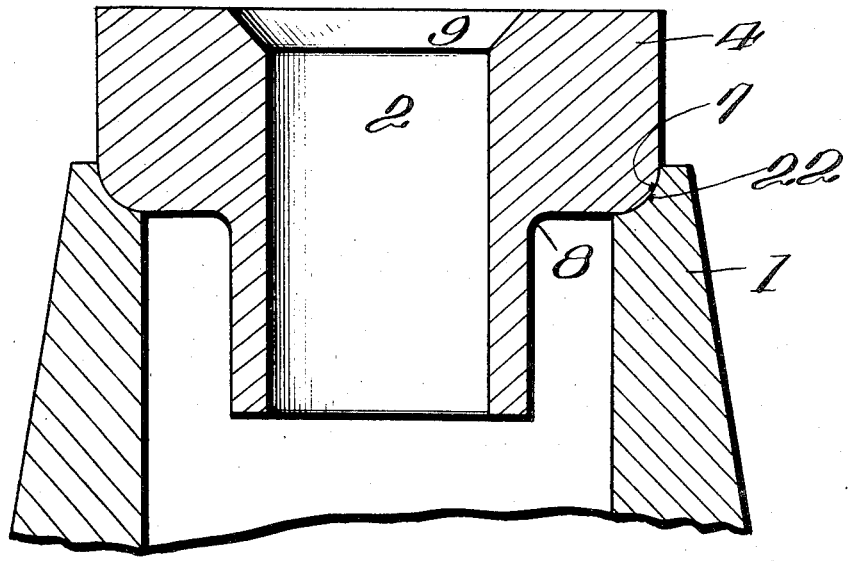

Patented Jan. 13, 1925.

1,523,211

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 1, 1924. Serial No. 753,158.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds having a thickened upper end to serve as means for supporting the feeder within the mold and also serve as means for retaining the heat at the upper end of the mold and ingot to prevent what is known as "piping" in the ingot and also to reduce segregation.

Another object of our invention is to provide a feeder of this character which is rigidly supported upon the upper end of the mold, and having means whereby the feeder is held in the upper end of the mold when the bore of the mold and the exterior diameter of the feeder vary in diameter, and at the same time provide a simple, cheap and effective feeder adapted to accomplish results.

A further object of our invention is to provide a feeder so constructed that its lower supporting edge conforms to the shape of the upper end of the mold whereby the feeder is firmly supported on the mold.

In the accompanying drawings:

Figure 1 is a vertical sectional view of a mold showing our improved feeder applied thereto.

Figure 2 is a bottom plan view of the feeder shown in Figure 1.

Figure 3 is a bottom plan view of a sectional feeder showing the same principle as that employed in Figures 1 and 2.

Figure 4 is a bottom plan view of a tubular feeder embodying the same principle as that shown in Figures 1 and 2.

Figure 5 is a bottom plan view of a tubular sectional feeder.

Figure 6 is a vertical sectional view of an ingot mold showing the upper end adapted to conform with the feeder.

Figure 7 is a vertical transverse sectional view of an ingot mold having its upper end adapted to conform with the feeder.

Referring now to the drawings, 1 represents the mold and 2 the feeder. The feeder 2 comprising a tubular body portion 3 adapted to enter the bore of the mold, and having the thickened upper end 4. This thickened upper end 4 is for the purpose of forming a supporting and strengthening means for the feeder on the mold, and also serves as means for retaining the heat at the upper end of the mold and ingot, whereby piping is prevented.

The lower face of the thickened portion 4 of the feeder has a plane face 5 resting upon the upper edge of the mold. Connecting the broad plane face 5 with the outer wall 6 of the thickened portion 4 is a convex surface 7, and connecting the outer wall of the body portion 3, and the inner end of the broad horizontal surface 5 is a concave wall 8. When the mold and the feeder are of the relative sizes as shown in Figure 1, the flat surface 5 rests upon the upper edge of the mold. Should the relative sizes of the feeder and mold vary greatly, the edge of the mold would either engage the concave surface 8 or the convex surface 7, and the feeder would be tightly held within the bore of the mold. The upper thickened portion 4 of the feeder is cut away as indicated at 9 whereby the bore of the mold has a flared upper end.

In a modification shown in Figure 3 we have made the feeder 2 in four sections 10, 11, 12 and 13, and each section has the concave and convex surfaces 7 and 8 the same as that shown in Figures 1 and 2 of the drawings.

In the modification shown in Figure 4, we have shown a circular feeder 14 having a convex surface 15 and the concave surface 16.

In Figure 5 we have shown the circular feeder made of four sections 17, 18, 19 and 20, each section having the convex surface 15 and the concave surface 16 the same as that shown in Figure 4.

In Figure 6 we have shown the upper edge of the mold having the rounded surface 21 adapted to conform with the concave wall 8 of the feeder 2.

In Figure 7 we have shown the upper edge of the mold having the concave portion 22 adapted to conform with the convex surface 7 of the feeder 2.

In these forms it will be seen that the feeder is tightly held on the upper end of the mold and allows of a greater variance in the relative diameters of the mold and the feeder.

Having thus fully described our invention what we claim is:—

1. A feeder for ingot molds comprising a body portion having a thickened upper end, and having a flat supporting face terminating in concave and convex surfaces.

2. A feeder for ingot molds comprising a body portion having a thickened upper end provided with a flat lower face connected to the exterior diameter of the body portion by a concave surface and connected with the exterior face of the thickened portion by a convex surface.

3. A feeder for ingot molds comprising a body portion having a thickened upper end, the lower faces of said thickened portions being horizontally arranged and connected by a concave and a convex surface.

4. A feeder for ingot molds comprising a series of sections having thickened upper ends, and having flat supporting faces terminating in concave and convex surfaces.

5. The combination with an ingot mold having its upper end provided with a curved surface, of a feeder having a correspondingly curved surface adapted to coordinate therewith for supporting the feeder on the mold.

6. The combination with an ingot mold having a curved surface at its upper end, a feeder having two curved surfaces one of which is adapted to coordinate with the curved surface of the mold for supporting it upon the upper end of the mold.

7. The combination with an ingot mold having its upper end provided with a concave surface, a feeder having a convex surface adapted to coordinate with the concave surface of the mold for supporting it upon the upper end of the mold.

8. The combination with an ingot mold having its upper end provided with a convex surface, a feeder having a concave surface adapted to coordinate with the convex surface of the mold for supporting it upon the upper end of the mold.

9. An ingot mold comprising a body portion having its upper end provided with a curved surface.

10. An ingot mold comprising a body portion having its upper end provided with a curved surface adapted to coordinate with a curved surface of a feeder.

In testimony whereof we affix our signatures.

BLOOMFIELD H. HOWARD.
ERNEST J. TURNER.